United States Patent
Bensberg et al.

(10) Patent No.: US 10,565,205 B2
(45) Date of Patent: Feb. 18, 2020

(54) INCREMENTALLY BUILDING HASH COLLISION TABLES

(71) Applicant: SAP SE, Walldorf (DE)

(72) Inventors: Christian Bensberg, Heidelberg (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 627 days.

(21) Appl. No.: 15/350,852

(22) Filed: Nov. 14, 2016

(65) Prior Publication Data

US 2018/0137164 A1    May 17, 2018

(51) Int. Cl.
*G06F 17/30* (2006.01)
*G06F 16/2455* (2019.01)

(52) U.S. Cl.
CPC ................... *G06F 16/2456* (2019.01)

(58) Field of Classification Search
CPC .................................... G06F 16/2456
USPC ........................................... 707/691
See application file for complete search history.

(56) References Cited

U.S. PATENT DOCUMENTS

| | | | | |
|---|---|---|---|---|
| 6,081,805 | A * | 6/2000 | Guha ............... | G06F 16/24556 |
| 6,421,662 | B1 * | 7/2002 | Karten ............. | G06F 16/2237 |
| 6,618,729 | B1 * | 9/2003 | Bhashyam ........ | G06F 16/283 |
| 2011/0202744 | A1 * | 8/2011 | Kulkarni ......... | G06F 12/1018 |
| | | | | 711/216 |
| 2012/0310974 | A1 * | 12/2012 | Zhu ................. | G06F 11/1453 |
| | | | | 707/769 |
| 2014/0214794 | A1 * | 7/2014 | Attaluri .......... | G06F 16/2456 |
| | | | | 707/714 |
| 2014/0330801 | A1 * | 11/2014 | Kaldewey ........ | G06F 16/2255 |
| | | | | 707/698 |
| 2015/0220600 | A1 * | 8/2015 | Bellamkonda .... | G06F 16/2456 |
| | | | | 707/747 |
| 2015/0286676 | A1 * | 10/2015 | Dickie ............. | G06F 16/244 |
| | | | | 707/737 |
| 2016/0275078 | A1 * | 9/2016 | Attaluri .......... | G06F 16/2255 |
| 2017/0012874 | A1 * | 1/2017 | Lee ................. | H04L 45/021 |
| 2017/0091271 | A1 * | 3/2017 | Attaluri ......... | G06F 16/24537 |
| 2017/0255675 | A1 * | 9/2017 | Chavan ........... | G06F 7/24 |
| 2018/0089261 | A1 * | 3/2018 | Li .................. | G06F 16/221 |

OTHER PUBLICATIONS

Non-Final Rejection dated Jul. 9, 2019 from U.S. Appl. No. 15/350,798.

* cited by examiner

*Primary Examiner* — Hicham Skhoun
(74) *Attorney, Agent, or Firm* — Sterne, Kessler, Goldstein & Fox P.L.L.C.

(57) ABSTRACT

Disclosed herein are system, method, and computer program product embodiments for incrementally building hash collision tables. In some embodiments, hashes and hash collision tables may be used to improve efficiency of relational operations, such as those used in relational databases. An embodiment operates by determining hash collisions between data entries, then storing newly determined hash values corresponding to collisions in a hash collision table. The storing can be done incrementally, without needing to rebuild hash tables or hash collision tables for all data entries.

20 Claims, 5 Drawing Sheets

INCREMENTALLY BUILDING HASH COLLISION TABLES

CROSS-REFERENCE TO RELATED APPLICATIONS

This application is related to U.S. patent application Ser. No. 15/350,798, entitled "Hash Collision Tables for Relational Join Operations," filed on Nov. 14, 2016, which is hereby incorporated by reference in its entirety.

BACKGROUND

Hashing operations can be used to increase the efficiency of relational operations, such as those used in relational databases, by enabling various data entries to be represented by hash values. Depending on how the hashing is done, hash collisions may occur, which may result from different data entries generating the same hash value. Resolving hash collisions may require the use of more complex data structures or more costly hashing operations, which may require additional storage and processing overhead to maintain, thereby reducing a substantial benefit derived from hashing.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for incrementally building hash collision tables.

Figure 1:
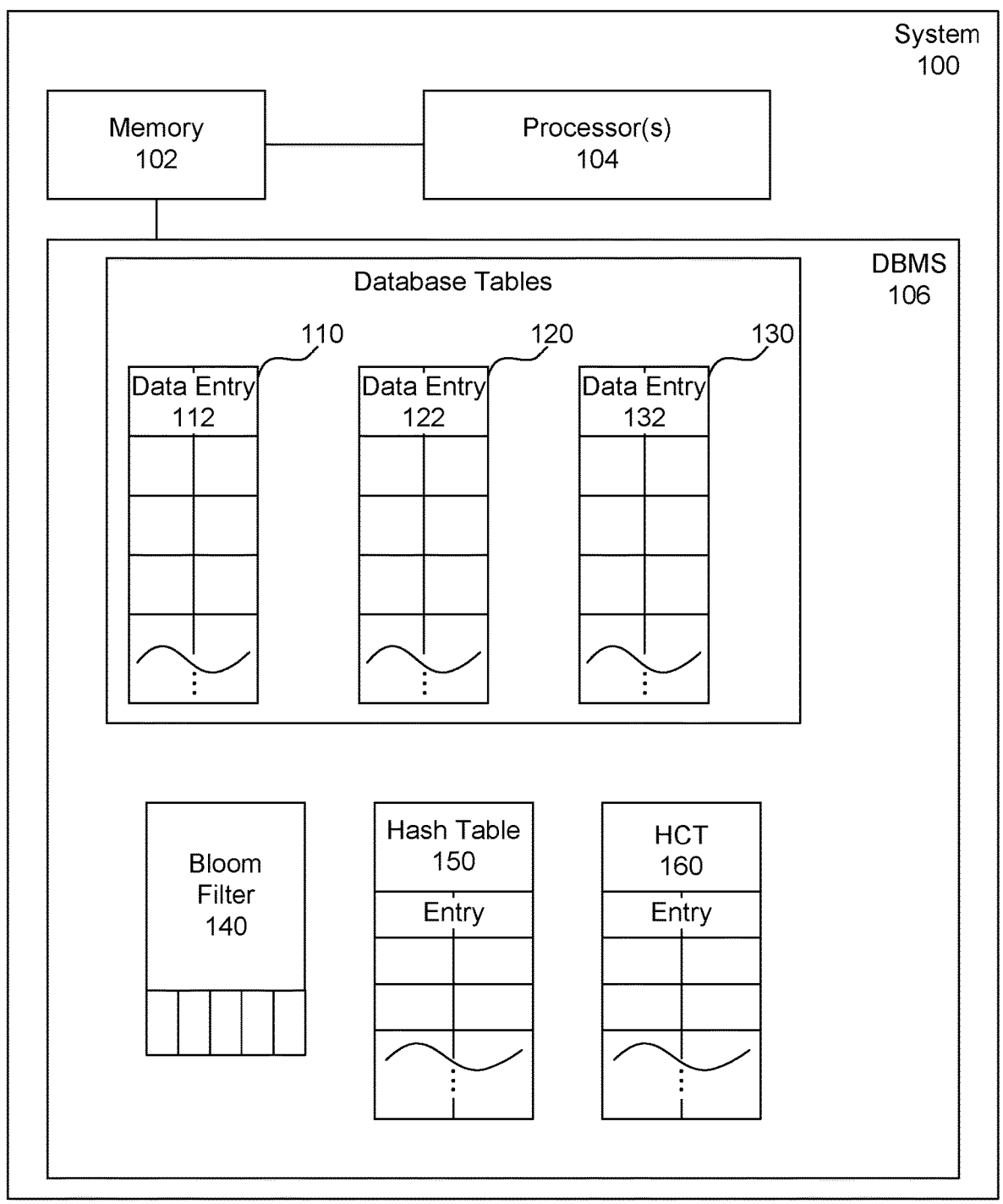
FIG. 1 is a block diagram of a database system that includes hash collision tables having incremental build functionality, according to some embodiments.

FIG. 1 is a block diagram of a system 100 that includes hash collision tables having incremental build functionality, according to some embodiments. System 100 may comprise hardware (e.g., circuitry, dedicated logic, programmable logic, microcode, etc.), software (e.g., instructions executing on a processing device), or a combination thereof. It is to be appreciated that not all components may be needed to perform the disclosure provided herein.

As shown in FIG. 1, system 100 comprises at least one memory 102 and at least one processor 104 coupled to the memory 102.

Memory 102 may represent a plurality of memory arrays, and processor 104 may include a plurality of processors, such as in a multiprocessing environment, which could further span a plurality of computer systems.

System 100 may include a database management system 106 (DBMS). While running, DBMS 106 preferably resides in memory 102, but may alternatively reside in other storage media. DBMS 106 may include database tables 110, 120, and 130, and each of these database tables 110, 120, and 130 may contain varying numbers of corresponding data entries 112, 122, and 132, and so on. While only three database tables 110, 120, and 130 are shown in the example of FIG. 1, system 100 or DBMS 106 may, in practice, include any number of database tables. Likewise, while only one data entry is shown in each database table, any number of data entries may be present in any database table.

System 100, DBMS 106, or both, may be equipped with circuitry, logic, or software, etc., that may perform operations including but not limited to storing data in storage devices, loading stored data into memory from storage devices, and/or processing data in ways including but not limited to arithmetic, comparisons, vector operations, matrix operations, hash functions, and, across sets of data, relational operations, aggregate operations, and database views, among other functions.

The database tables 110, 120, and 130 may refer to any type of structured data set in a relational model. Such structured data sets may be column-oriented or row-oriented tables, associative arrays, key-value stores, or similar groups of data arrangements or patterned storage, to name a few non-limiting examples.

Bloom filter 140 may be used generally to determine probabilistically whether or not an element is present in a set of elements, using multiple different hash functions. Bloom filter 140 may take the form of a vector, array, bitmap, bit vector, or similar other type of simplified data structure, for example, to reference other larger or more complex elements in a data set. When another component of system 100 references Bloom filter 140, Bloom filter 140 may indicate or identify the possibility that an element may be in a data set, and also may indicate or identify, with a higher degree of certainty, that a given element is absent from the data set.

An example configuration of Bloom filter 140 will take into account the number of corresponding data entries, such as the data entries in database tables 110, 120, and 130, and will also take into account the number of hash functions used in system 100 or DBMS 106. A Bloom filter may be regenerated entirely when data sets add or change entries. In some embodiments, Bloom filter 140 may be incrementally built, appending bits as needed rather than rebuilding from scratch, resulting in reduced processing overhead. To accommodate data sets of varying sizes, Bloom filter 140, in some embodiments, may use known variations of a relatively small number of hash functions as effectively as using a larger number of independent hash functions. In this way, Bloom filter 140 may have many independent hash functions, or many variations of a smaller number of hash functions, either way allowing Bloom filter 140 to change size incrementally without necessarily incurring any significant increase in design complexity or processing overhead.

In some embodiments, Bloom filter 140 may be a single functional structure used for all database tables. In other embodiments, Bloom filter 140 may include a plurality of Bloom filters each used with an associated database table as it is accessed, in order to reduce processing overhead.

In some embodiments, a hash table 150 may be used for storing hash values of each corresponding data entry in each corresponding database table 110, 120, and 130. In other embodiments, hash table 150 may include a separate hash table for each database table accessed by system 100 or DBMS 106.

For example, each data entry in a database table may be processed by a hash function to determine a hash value for each data entry. Each hash value corresponding to each data entry may be stored in a hash table 150. Hash table 150 may further include multiple separate hash tables. In some embodiments, each database table may have a corresponding hash table. In other embodiments, there may be multiple database tables for each corresponding hash table.

Hash values may be generated by hash functions. A hash function may take a data entry as input and may produce a hash value as output. Generally, most input data entries, for any given hash function, may each yield a unique hash value. Because of this property of hash values, and due to the fact that hash values tend to be of a consistent fixed length for any given hash function, it is generally less costly in terms of processing overhead to compare hash values rather than directly comparing large data entries when determining whether large data entries are the same or different from each other. Although comparing hashes may be more efficient generally, not all matching hash values may correspond to the same matching data entries. This may happen where there is a hash collision, where one hash value corresponds to multiple distinct data entries. In such cases, further processing is needed to resolve the hash collision, as described below.

Hash collision table (HCT) 160 may be used for storing hash collision values for which hash collisions are determined to exist. In some embodiments, a hash collision exists where at least two distinct data entries each resolve to the same hash value as a result of the same hash function. In some embodiments, a hash value is called a hash collision value in any case where the hash value corresponds to a known hash collision determined to exist in system 100 or DBMS 106. In other words, a hash collision value may be the result of a hash function as applied to multiple different input values, such as multiple data entries from at least one database table. In some embodiments, hash collision values in the HCT 160 may be further indexed or referenced for resolution with their corresponding original data values that are distinct from each other for each hash value in the HCT 160.

Some embodiments may further employ a resolution dictionary. A resolution dictionary may be a separate data structure that may associate a unique identifier, such as a special index value, with each hash collision value in the hash collision table. A resolution dictionary may also preferably associate the special index value and/or each hash collision value with corresponding data entries that each result in the same hash collision value of a detected hash collision. By ensuring a unique identifier, such as the special index value, for each original data entry that would result in a hash collision, such unique identifiers may, in some embodiments, be used in place of or alongside the hash values that have collisions, in order to realize the benefits of hashes when performing relational operations with database tables having large data entries. In this way, the problem of hash collisions may be resolved, for example, when using hash values to determine matches in relational join operations.

Other embodiments may use other methods of resolving hash collisions in addition to or in lieu of the resolution dictionary. Other such methods include, but are not limited to: multiple hashing, including double hashing, enhanced double hashing, and triple hashing, further including single hash functions or multiple independent hash functions; separate chaining, of various data structures; and open addressing methods, including coalesced hashing, cuckoo hashing, hopscotch hashing, further including probe sequences such as linear probing or quadratic probing.

Data entries are not necessarily fixed; typically data entries may be frequently inserted or updated. Hence, hash collision tables and the other mentioned data structures have to be constantly updated. In so doing, it should not be necessary to load all data for the comparison. With the presence of partitioning, involving partitions with old data or historic data, it should be possible to build hash collision tables incrementally for the relevant partitions, without loading vast amounts of data from historic partitions that do not contribute to the result set of the query at hand.

Figure 2:
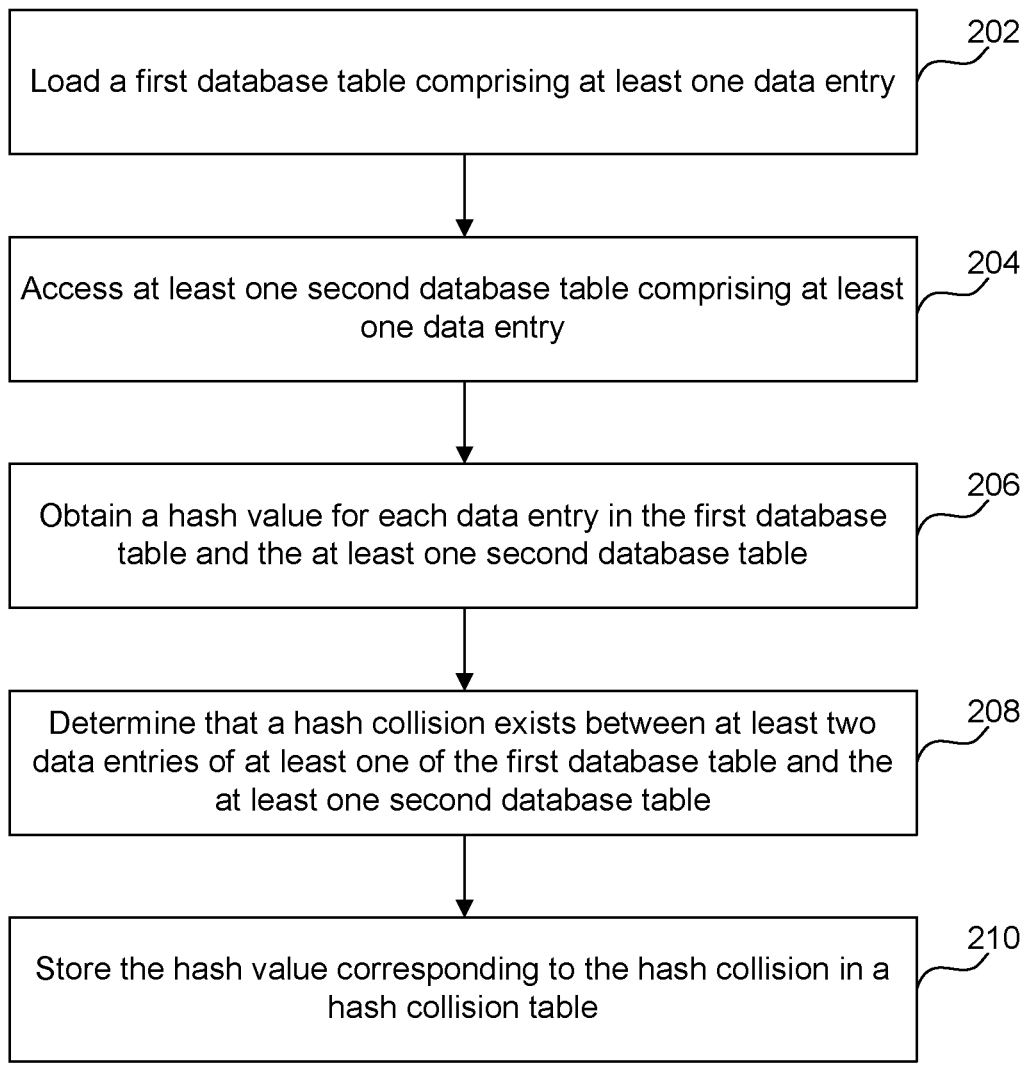
FIG. 2 is a flowchart illustrating a process for incrementally building hash collision tables, according to some embodiments.

FIG. 2 is a flowchart for a process 200 for incrementally building hash collision tables, according to an embodiment. Process 200 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Process 200 shall be described with reference to FIG. 1. However, process 200 is not limited to that example embodiment.

In 202, processor 104 of system 100 loads a first database table 110 into memory 102, if the first database table 110 is not already loaded. The first database table includes at least one data entry 112. Also in 202, any other database tables that may be needed, such as for a relational operation, may be loaded, concurrently with or subsequent to loading the first database table 110. For example, if a second database table 120 has not yet been loaded but will be needed for an operation, the second database table 120 may be also loaded into memory in 202. The second database table 120 may include at least one data entry 122.

In 204, processor 104 may access the second database table 120. For example, if system 100 or DBMS 106 performs a relational operation on memory-resident database tables, such as a join operation, then at least two database tables in memory 102 may be accessed for processing by processor 104. In some embodiments, this accessing can be to any number of other database tables, and the accessing may take place concurrently, sequentially, randomly, or in any other suitable pattern or order. In another embodiment, only one database table may be involved, such as in a case of a self-join, for example. Alternatively, a second database table may also be a copy of the first database table, In 206, processor 104 obtains a hash value for each data entry in the first database table 110 and the second database table 120. In order to obtain a hash value for any data entry, the data entry is processed with an associated hash function. Unlike Bloom filter 140, hash table 150 may use the same hash function for entries in the same hash table.

For most data entries, the hash function should return a unique hash value for each data entry. In some cases, however, there may be two or more distinct data entries which, when input into the same hash function, cause the hash function to return an identical hash value, such that the resulting hash values are not unique. In these cases, a hash collision exists, which is determined in 208 below.

Specifically, in 208, processor 104 further determines whether a hash collision exists between at least two data entries of (1) the first database table 110, (2) the second database table 120, and/or (3) the first database table 110 and the second database table 120. In order to determine whether a hash collision exists among multiple hash values, processor 104, in some embodiments, executes a comparison operation for each hash value against each other hash value available to system 100 or DBMS 106, such as in hash table 150. In any case where hash values are determined to be equal (matching), corresponding data entries for each matching hash value may then be compared to determine whether the corresponding data entries are also equal or unequal. In cases where the corresponding data entries are not equal, then processor 104 will have successfully determined that a hash collision exists. Aside from this illustrative embodiment, any other well-known methods of hash value comparison may be used for improved efficiency.

In 210, for each case where a hash collision is determined to exist, processor 104 stores the hash collision value corresponding to the hash collision determined in 208 in the hash collision table 160. If the same hash collision value already exists in the table, then the same value need not be additionally stored again in hash collision table 160.

Hash collision table 160 may contain a list of hash values known to have collisions. In some embodiments, hash collision table 160 may contain other information corresponding to the hash collision values, such as associated information relating to the distinct data entries that yield the same hash value for a given hash function. Additionally, in other embodiments, hash collision table 160 may further contain information similar to that contained in a resolution dictionary as described above.

Following this process 200, hash table 150 may be fully populated with hash values from each data entry of each of at least two database tables, and hash collision table 160 may be filled as necessary with any hash values that are determined to have collisions among any data entries loaded or accessed from any of the database tables that are loaded or accessed in performing the process 200.

Processor 104 may further check hash values already in the hash table 150 against newly obtained hash values written into the hash table 150, as further shown in FIG. 3 and as described in process 300 below. In another embodiment, this action may be performed employing at least one Bloom filter 140 corresponding to the hash table.

In some embodiments, as noted above, a single Bloom filter 140 may correspond to the entries in all database tables. In other embodiments, there may be a separate Bloom filter corresponding to each database table, or corresponding to a set of database tables, such as a set or subset of selected database tables within DBMS 106. Bloom filter 140 may be used independently, or in combination with hash table 150 and/or hash collision table 160, in some exemplary embodiments.

By using Bloom filter 140 as described here for some embodiments, further performance gains may be realized, because some hash value comparisons may be skipped where they are determined to be unnecessary. For example, where a Bloom filter corresponding to a hash table indicates or identifies an absence of a matching data entry within a hash table, comparison of hash values may be determined unnecessary. In other embodiments, where a Bloom filter corresponding to a database table indicates or identifies an absence of a matching data entry within a database table, computation of hash values may be determined unnecessary. Consequently, hash value computations may be skipped for certain database tables, depending on system resources and configuration.

Processor 104 may further forward any newly obtained hash value that is equal to any hash value already in the hash table 150 to the hash collision table 160, to be stored in the hash collision table 160 as a hash collision value.

Hash table 150 may be appended with hash values from each data entry newly accessed from any database table, and hash collision table 160 may be filled as necessary with any hash values that are newly determined to have collisions among any data entries loaded or accessed from any of the database tables that are loaded or accessed.

Additionally, in some embodiments, Bloom filter 140 may be fully updated upon loading or accessing any newly loaded or newly accessed database tables or partitions. In some embodiments, Bloom filter 140 may be incrementally updated upon loading or accessing any newly loaded or newly accessed database tables or partitions, without fully regenerating Bloom filter 140. By incrementally updating the Bloom filter, additional processing overhead may be averted.

Figure 3:
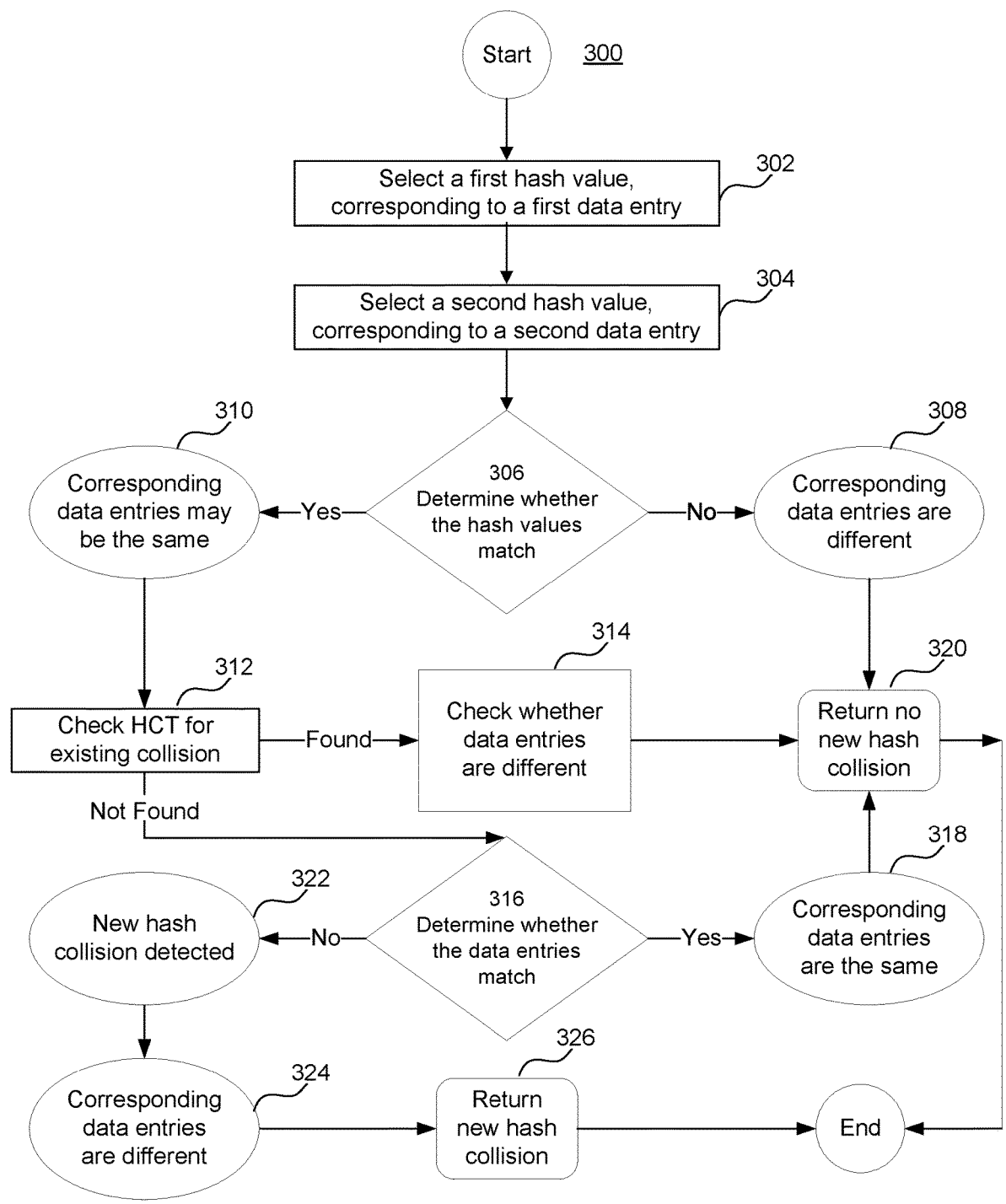
FIG. 3 is a flowchart illustrating, in greater detail, a subprocess for determining hash collisions, according to some embodiments.

FIG. 3 describes process 300, which shows in greater detail how hash collision tables are incrementally built, with respect to 206-210 of process 200 shown in FIG. 2. In some embodiments, process 300 of FIG. 3 is also applicable to later steps of process 400 described below.

In 302, processor 104 selects a first hash value, corresponding to a first data entry. This hash value could be selected as retrieved from hash table 150, or it could alternatively be generated on the fly, such as concurrently with or immediately following selection of a data entry from a database table. The corresponding data entry here could refer to any data entry in any database table; the focus of this selection is on the hash value corresponding to the data entry.

Similarly, in 304, processor 104 selects a second hash value, corresponding to a second data entry. Operations 302 and 304 may be executed concurrently or sequentially in any order. These two hash values are selected for comparison, for example, when a database operation is being performed across two database tables, where each of the first database entry and the second database entry are in different database tables of the two database tables across which a database operation is being performed.

In 306, processor 104 determines whether the first hash value matches the second hash value. In other words, processor 104 executes a comparison operation to determine whether or not the two hash values here are equal. If the two hash values here are not equal, execution then proceeds to 308. Otherwise, the first hash value is the same as the second hash value, and execution proceeds to 310.

In 308, it is necessarily determined that, because the hash values are unequal, the corresponding data entries must also be unequal. Processor 104 may set a flag, pass a token by reference or by value, or otherwise signal system 100 or DBMS 106 that the data entries do not match. Such signaling would facilitate performance of a join operation, for example. Execution would also not return any hash collision to be stored in hash collision table 160, such as shown in 320. In some embodiments, a different value may be returned to a calling function, routine, or subroutine, to indicate that no hash collision is to be returned.

In 310, following detection of matching hash values in 306, it is then necessary to test whether the matching hash values are indicative of matching data entries, or instead, if the matching hash values are the result of a hash collision between non-matching data entries. At this point, it is possible that the corresponding data entries are the same, but it is not yet possible to be sure if the hash function used could be expected to produce hash collisions. Execution advances to the decision block of 312.

In 312, processor 104 checks the hash collision table 160 to determine whether the hash values correspond to any hash collision already detected. Specifically, if a hash collision had been detected, its hash collision value would have already been stored in the hash collision table 160, and a comparison of one of the first or second hash values here against all hash collision values in the hash collision table 160 would determine that a hash collision exists if the matching hashes presently being evaluated happen to coincide with an existing, already known hash collision. In this case, where a hash collision is found, in the hash collision table 160, which corresponds to the currently selected hash values, then no new hash collision needs to be added to the hash collision table 160. Still, the corresponding data values must be checked, either directly, or via a resolution dictionary or by other suitable hash collision resolution means, such as in 314.

In 314, the corresponding data values are checked for whether or not they are different from each other. Merely because a hash collision exists does not indicate with certainty that the corresponding data entries are different in this case. Whether the data entries are the same or different, the result of such a direct comparison would be relevant to a database operation, such as a relational join operation, for example. However, direct comparison of each corresponding data entry may not always be necessary in all embodiments. In embodiments where a resolution dictionary is used, the resolution dictionary may be referenced to determine whether such data values from the corresponding hash collision are already known and assigned a unique identifier, such as a special index. If so, then processor 104 can signal system 100 or DBMS 106 by any appropriate means to indicate that the corresponding data entries are different. After resolution dictionary or similar structure is employed, if there is no indication that the data entries are different, then direct comparison of the data entries may be necessary. Although, as in 312 and 320, no new hash collision value would need to be added to the hash collision table, resolution dictionary or similar structures may need to be updated accordingly. If direct comparison reveals that the data entries are indeed different, then any new data entry corresponding to this hash collision may preferably be appended to the resolution dictionary with a new unique identifier. Such new data entry may be the first data entry, the second data entry, or both data entries. Otherwise, the data entries are equal. Processor 104 may also accordingly signal system 100 or DBMS 106 by a return value or similar means, as needed.

If operation 312 did not yield a match with existing hash collision values in the hash collision table 160, then execution proceeds to 316. In 316, processor 104 conducts a direct comparison of the data entries to determine whether the corresponding data entries match.

If the corresponding data entries are the same, then execution proceeds to 318. In 318, processor 104 may signal such information to system 100 or DBMS, to the extent that such information may be needed for database operations, for example. Because there is a definite match between the data entries, then there is no hash collision, and processor 104 may also signal that information, such as by a return value or other suitable means, as in 320.

Following any of 308, 314, or 318, no new hash collision value needs to be added to the hash collision table 160, and execution proceeds to 320. In 320, processor 104 need not perform any particular action. However, in some embodiments, a special signal or value may be set or passed, indicating or identifying such information to any other system that would need to have such information. Following 320, execution of process 300 terminates.

If, in 316, the data entries do not match, this signifies a newly detected hash collision in 322. The newly detected hash collision in 322 further must indicate that the data entries are different, in 324. Processor 104 may signal either or both of these pieces of information to any other system that would need to have such information.

Following the newly detected hash collision, execution then advances to 326. In 326, the newly detected hash collision value is then returned, where it may be forwarded to the hash collision table to be stored for later reference. Execution of process 300 then terminates.

Process 300 may be repeated for any comparison of hash values. For illustrative purposes, FIG. 3 shows only one illustrative embodiment for incrementally building hash tables but this disclosure is not limited to that example embodiment. Other embodiments may further include a Bloom filter 140 and a resolution dictionary, each further saving steps in determining whether data values are present and matching. Such information is generally useful in performing many types of database operations.

Process 300 may be used for significant improvement of system performance in systems or database management systems where data entries are sufficiently large that direct comparison of every entry would consume excessive system resources or be otherwise prohibitive. Furthermore, the incremental building of hash tables, hash collision tables, and Bloom filters additionally streamlines this process 300 to provide a more scalable solution over prior art systems. It should be noted that process 300 and similar embodiments may not necessarily be an optimal solution for all possible database applications, but may be an improvement in some scenarios.

Figure 4:
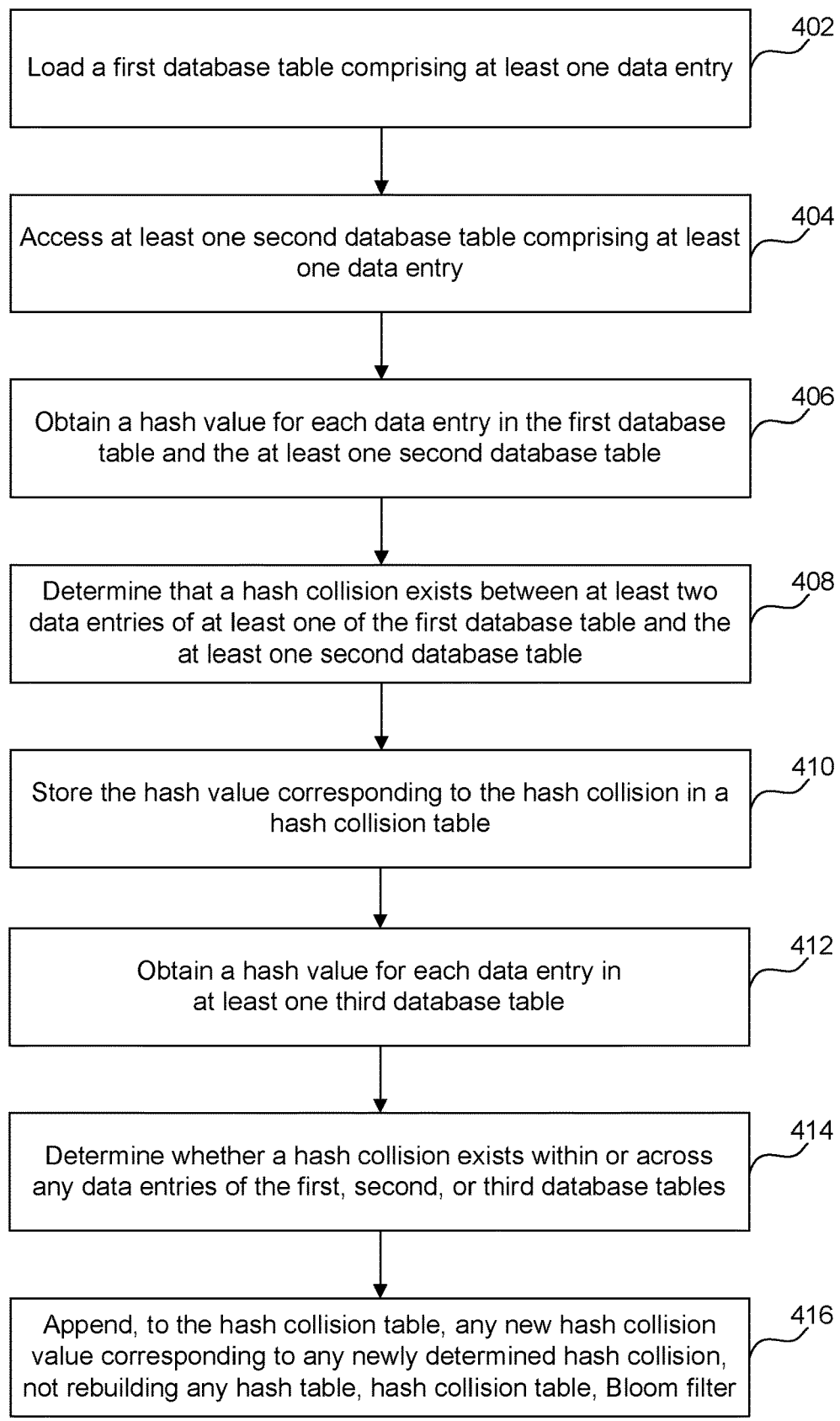
FIG. 4 is a flowchart illustrating a process for incrementally building hash collision tables, according to some embodiments.

FIG. 4 shows process 400, which builds on concepts from process 200, above, shown in FIG. 2. Following process 400, new hash collision values are stored in hash collision table 160 by appending them to the existing hash collision table 160, without rebuilding hash collision table 160, hash table 150, and/or Bloom filter 140 from scratch, thus realizing performance gains.

In 402, processor 104 of system 100 loads the first database table 110 into memory 102, if the first database table 110 is not already loaded. The first database table includes at least one data entry 112. Also in 402, any other database tables that may be needed, such as for a relational operation, may be loaded at this time, concurrently with or subsequent to loading the first database table 110. For example, if a second database table 120 has not yet been loaded but will be needed for an operation, then second database table 120 may be further loaded into memory in 402. Second database table 120 includes at least one data entry 122.

In 404, processor 104 may access the second database table 120. In practice, this accessing can be to any number of other database tables, and the accessing may take place concurrently, sequentially, randomly, or in any other suitable pattern or order.

In 406, processor 104 obtains a hash value for each data entry in the first database table 110 and the second database table 120. In order to obtain a hash value for any data entry, the data entry is processed with a hash function. In some embodiments, hash table 150 uses the same hash function for all entries in the same hash table.

In 408, processor 104 further determines whether a hash collision exists between at least two data entries of (1) the first database table 110, (2) the second database table 120, and/or (3) the first database table 110 and the second database table 120. In order to determine whether a hash collision exists among multiple hash values, processor 104, in an example embodiment, effectively executes a comparison operation for each hash value against each other hash value available to system 100 or DBMS 106, such as in hash table 150. In any case where hash values are determined to be equal (matching), corresponding data entries for each matching hash value may then be compared by other means to determine whether the corresponding data entries are also equal or unequal. In cases where the corresponding data entries are not equal, then processor 104 will have successfully determined that a hash collision exists. Other well-known methods of hash value comparison may be used beyond the non-limiting example of this illustrative embodiment.

In 410, for each case where a hash collision is determined to exist, processor 104 stores the hash collision value corresponding to the hash collision determined in 208 in a hash collision table 160. If the same hash collision value already exists in the table, then the same value need not be additionally stored again in hash collision table 160.

In 412, processor 104 may further obtain a hash value for any new data entries in the first database table 110, the at least one second database table 120, and at least one third database table 130, containing at least one data entry 132. The third database table 130 may have just been newly accessed or newly loaded into memory. This means that, because the third database table 130 is being newly loaded in this particular embodiment, new hash values must be generated for each data entry 132 to be accessed in the third database table. Additionally, any new data entries that may have been added to any of the first database table 110 and the at least one second database table 120 must also be obtained, such as either generated with a hash function or retrieved from an existing hash table 150 where applicable.

In 414, for each obtained hash value corresponding to the third database table 130, to determine that a hash collision exists between at least two data entries of at least one of the first database table 110, the second database table 120, and the third database table 130.

In 416, processor 104 may append, to the hash collision table, any hash collision value corresponding to any hash collision determined to exist between at least two data entries of at least one of the first database table, the at least one second database table, and the at least one third database table.

Thus, as shown here in this further embodiment, any other number of database tables can be newly accessed, from which hash values may be determined and incrementally added to the hash table 150. Any newly determined hash collisions would then result in the corresponding hash values being incrementally added to the hash collision table 160.

Although hash tables, hash collision tables, and Bloom filters each may be globally built and updated across all database tables in a DBMS 160, for example, such global rebuilding and updating can cause the system 100 to incur significant processing burdens and to require significant storage space and operations. Thus, it can be advantageous to allow for incremental building of hash collision tables, as well as hash tables and Bloom filters as shown herein.

Figure 5:
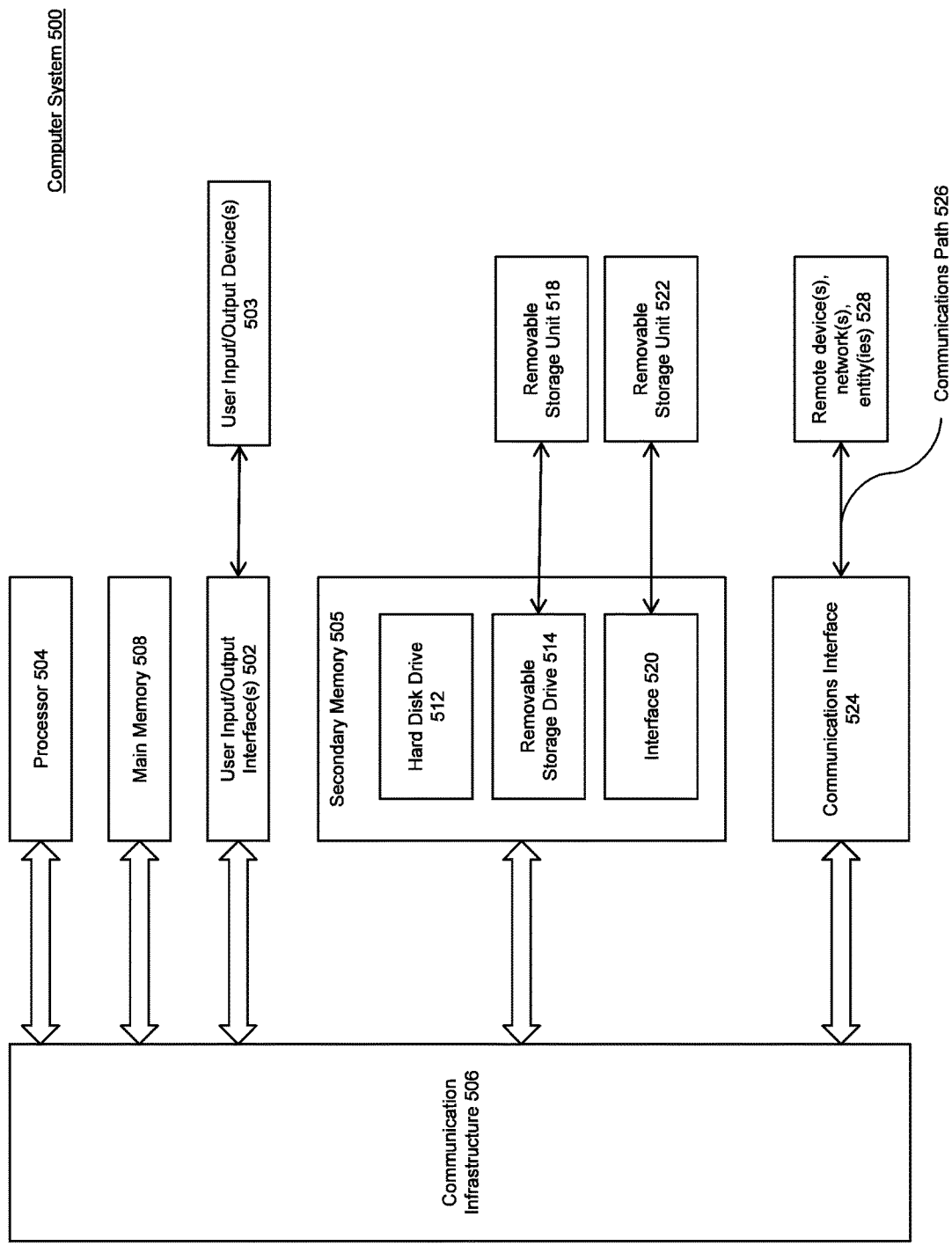
FIG. 5 is an example computer system useful for implementing various embodiments.

Various embodiments can be implemented, for example, using one or more computer systems, such as computer system 500 shown in FIG. 5. Computer system 500 can be used, for example, to implement the structures and operations of FIGS. 1-4.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 505, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," "some embodiments," "other embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method of incrementally building hash collision tables, comprising:
    loading, by at least one processor, a first database table comprising at least one data entry;
    accessing, by the at least one processor, at least one second database table comprising at least one data entry;
    obtaining, by the at least one processor, a hash value for each data entry in the first database table and the at least one second database table, wherein a first data entry in the first database table corresponds to a first hash value, and wherein a second data entry in the second database table corresponds to a second hash value;
    determining, by the at least one processor, that a hash collision exists between at least two data entries of at least one of the first database table and the at least one second database table, wherein the determining comprises:
        executing, by the at least one processor, a comparison between the first hash value and the second hash value,
        determining, by the at least one processor, as a result of the comparison, that the first hash value is equal to the second hash value,
        comparing, by the at least one processor, in response to the determining that the first hash value is equal to the second hash value, the first data entry with the second data entry, and
        determining, by the at least one processor, as a result of the comparing the first data entry with the second entry, that the first data entry is distinct from the second data entry, wherein the first data entry and the second data entry being distinct from each other while having equal hash values is a basis for the determining that the hash collision exists; and
    storing, by the at least one processor, a hash collision value corresponding to the hash collision in a hash collision table.

2. The method of claim 1, further comprising:
    storing, by the at least one processor, each obtained hash value in a hash table.

3. The method of claim 2, the determining further comprising:
    checking, by the at least one processor, hash values that have been written into the hash table against newly obtained hash values; and
    storing, by the at least one processor, any newly obtained hash value that is equal to any hash value already in the hash table, as a newly determined hash collision value in the hash collision table.

4. The method of claim 3, the checking further comprising:
    employing, by the at least one processor, at least one Bloom filter corresponding to the hash table.

5. The method of claim 1, further comprising:
    accessing, by the at least one processor, at least one third database table;
    obtaining, by the at least one processor, a hash value for each data entry in the at least one third database table;
    for each obtained hash value corresponding to the at least one third database table:
        determining, by the at least one processor, that a hash collision exists between at least two data entries of at least one of the first database table, the at least one second database table, and the at least one third database table; and appending, by the at least one processor, to the hash collision table, any hash collision value corresponding to any determined hash collision.

6. The method of claim 5, further comprising:
writing, by the at least one processor, any newly determined hash collision values to the hash collision table without rebuilding the hash collision table for data entries in all database tables.

7. The method of claim 1, further comprising:
writing, by the at least one processor, any newly obtained hash values to the hash table without rebuilding the hash table for data entries in all database tables.

8. A system, comprising:
a memory; and
at least one processor coupled to the memory and configured to:
load a first database table comprising at least one data entry;
access at least one second database table comprising at least one data entry;
obtain a hash value for each data entry in the first database table and the at least one second database table, wherein a first data entry in the first database table corresponds to a first hash value, and wherein a second data entry in the second database table corresponds to a second hash value;
determine that a hash collision exists between at least two data entries of at least one of the first database table and the at least one second database table, wherein to determine that the hash collision exists, the processor is further configured to:
execute, a comparison between the first hash value and the second hash value,
determine, as a result of the comparison, that the first hash value is equal to the second hash value,
compare, in response to the determining that the first hash value is equal to the second hash value, the first data entry with the second data entry, and
determine, as a result of the comparing the first data entry with the second entry, that the first data entry is distinct from the second data entry, wherein the first data entry and the second data entry being distinct from each other while having equal hash values is a basis for the determining that the hash collision exists; and
store a hash collision value corresponding to the hash collision in a hash collision table.

9. The system of claim 8, the at least one processor further configured to store each obtained hash value in a hash table.

10. The system of claim 9, wherein to determine that a hash collision exists between at least two data entries of at least one of the first database table and the at least one second database table, the at least one processor is configured to:
check hash values already in the hash table against newly obtained hash values; and
store any newly obtained hash value that is equal to any hash value already in the hash table, as a newly determined hash collision value in the hash collision table.

11. The system of claim 10, wherein to check hash values already in the hash table, the at least one processor is further configured to:

employ at least one Bloom filter corresponding to the hash table.

12. The system of claim 8, the at least one processor further configured to:
access at least one third database table;
obtain a hash value for each data entry in the at least one third database table;
for each obtained hash value corresponding to the at least one third database table:
determine that a hash collision exists between at least two data entries of at least one of the first database table, the at least one second database table, and the at least one third database table; and
append, to the hash collision table, any hash collision value corresponding to any determined hash collision.

13. The system of claim 8, the at least one processor further configured to:
write any newly obtained hash values to the hash table and write newly determined hash collision values to the hash collision table, without rebuilding the hash table and the hash collision table for data entries in all database tables.

14. A non-transitory computer-readable medium having instructions stored thereon that, when executed by at least one computing device, causes the at least one computing device to perform operations comprising:
loading a first database table comprising at least one data entry;
accessing at least one second database table comprising at least one data entry;
obtaining a hash value for each data entry in the first database table and the at least one second database table, wherein a first data entry in the first database table corresponds to a first hash value, and wherein a second data entry in the second database table corresponds to a second hash value;
determining that a hash collision exists between at least two data entries of at least one of the first database table and the at least one second database table, wherein the determining comprises:
executing, a comparison between the first hash value and the second hash value,
determining, as a result of the comparison, that the first hash value is equal to the second hash value,
comparing, in response to the determining that the first hash value is equal to the second hash value, the first data entry with the second data entry, and
determining, as a result of the comparing the first data entry with the second entry, that the first data entry is distinct from the second data entry, wherein the first data entry and the second data entry being distinct from each other while having equal hash values is a basis for the determining that the hash collision exists; and
storing a hash collision value corresponding to the hash collision in a hash collision table.

15. The non-transitory computer-readable medium of claim 14, the operations further comprising:
storing each obtained hash value in a hash table.

16. The non-transitory computer-readable medium of claim 15, the determining comprising:
checking hash values already in the hash table against newly obtained hash values; and
forwarding any newly obtained hash value that is equal to any hash value already in the hash table to the hash collision table, to be stored in the hash collision table.

17. The non-transitory computer-readable medium of claim 16, the checking comprising:
employing at least one Bloom filter corresponding to the hash table.

18. The non-transitory computer-readable medium of claim 14, the operations further comprising:
accessing at least one third database table;
obtaining a hash value for each data entry in the at least one third database table;
for each obtained hash value corresponding to the at least one third database table:
determining that a hash collision exists between at least two data entries of at least one of the first database table, the at least one second database table, and the at least one third database table; and
appending, to the hash collision table, any hash collision value corresponding to any determined hash collision.

19. The non-transitory computer-readable medium of claim 18, the appending comprising:
writing any newly determined hash collision values to the hash collision table without rebuilding the hash collision table for data entries in all database tables.

20. The non-transitory computer-readable medium of claim 14, the operations further comprising:
writing any newly obtained hash values to the hash table without rebuilding the hash table for data entries in all database tables.

* * * * *